Oct. 22, 1968 E. SENNHENN 3,407,268

TELEVISION SCANNING SYSTEM UTILIZING FEEDBACK FOR CONTRAST COMPENSATION

Filed June 30, 1964

Inventor:
Emil Sennhenn
by Richard J. Striker
Att'y 3,407,268

TELEVISION SCANNING SYSTEM UTILIZING FEEDBACK FOR CONTRAST COMPENSATION

Emil Sennhenn, Darmstadt-Arheilgen, Germany, assignor to Fernseh G.m.b.H., Darmstadt, Germany Filed June 30, 1964, Ser. No. 379,152
Claims priority, application Germany, July 5, 1963, F 40,162
8 Claims. (Cl. 178—7.2)

ABSTRACT OF THE DISCLOSURE

An electronic circuit arrangement for controlling the level of a television signal produced by a television scanning device. The arrangement is especially applicable to scanning films or slides having different contrast characteristics. The circuit arrangement serves to maintain the level of the television signal constant, regardless of the contrast characteristics. A control rectifier rectifies the produced television signal and transmits it to a control voltage generator where it may become suitably amplified. A damping network is provided to suppress any oscillations that may arise within the circuitry. A voltage limiting device in the form of a biased diode maintains the signal within a predetermined range of values. The output of the voltage limiting device is applied to a control stage which, in turn, modifies the intensity of the television signal so as to compensate the latter for any variation in contrast.

The present invention relates in general to a circuit arrangement for controlling the level of a television signal produced by a television scanning device, especially for scanning films or slides.

It is desirable that films of different contrast be transmitted in such a manner that the contrast of the television picture is possibly held constant. When such films are scanned by means of a film scanner, the signal voltages for black and white vary. It is therefore advisable to compensate for these fluctuations by control means.

In Vidicon film scanners it has proved to be of advantage to apply such control means, which compensate for the loss of light in a film of greater density by an appropriate change of the light flux illuminating the film. In this case the light flux is varied either by a direct control of the current through the filament of the projection lamp or by the setting of a diaphragm or the darkening of a filter between projection lamp and film at constant current.

In either case a control signal produced by a control voltage generator is derived from the video signal of the television camera. This generator supplies a control voltage to a control stage, which controls the light flux of the projection lamp. As control stage there may be used for example a magnetic amplifier, which controls the current through the filament of the projection lamp.

In the control systems discussed above oscillations may appear. In order to avoid these it is usual to provide damping means between the control voltage generator and the control stage consisting in general of a filter condenser, a series resistance and one or more RC elements. In order to ensure that the time constant of this control arrangement is kept possibly small, a high voltage for the change in charge is applied to the damping means. Therefore, the control voltage generator is connected to an operating voltage, of which the range considerably exceeds on either side the useful control range of the control circuit arrangement. Thus the condensers of the damping circuit are charged to a high voltage, when no control signal is supplied. This arrangement suffers from the disadvantage that on the return of the control signal it takes a relatively long time until the normal control condition is re-established.

It is therefore a main object of the invention to provide a circuit arrangement of the type mentioned which is comparatively simple in its structure and will overcome the aforementioned disadvantage.

It is another object of the invention to provide a novel control circuit arrangement for a television scanning device, the control voltage of which is prevented from increasing beyond the useful control range of the control circuit arrangement.

It is a further object of the invention to provide a novel control circuit arrangement for a television scanning device with a small control time constant.

Although the novel features which are believed to be characteristic of this invention will be pointed out with particularity in the appended claims, the manner of its organization and the mode of its operation will be better understood by referring to the following description, read in conjunction with the accompanying drawings, forming a part thereof, in which:

In the drawing like elements are designated by like reference numerals. For the sake of simplicity only those parts are shown in the drawing which are necessary for the understanding of the invention.

Figure 1:
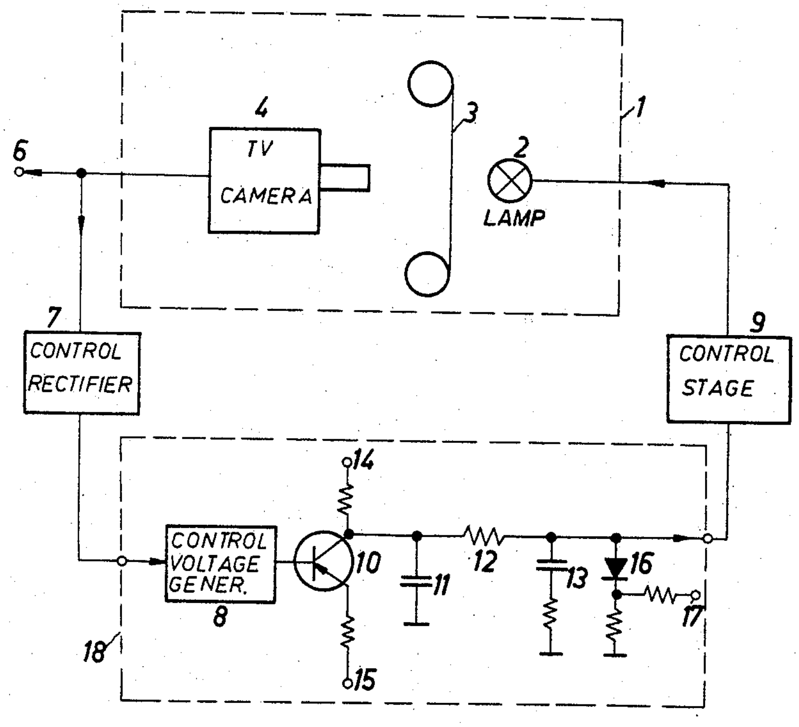
FIG. 1 is a block circuit diagram of a control arrangement in a television scanning device.

Referring to the block circuit diagram represented in FIG. 1, in the arrangement 1 the picture of the film 3 illuminated by the projection lamp 2 is imaged on the photosensitive layer of the television pickup tube of the television camera 4. The video signal produced by the television camera 4 may be taken off at the terminal 6. For producing a control signal, the video signal is rectified in the control rectifier 7 and applied to an arrangement 18 with the control voltage generator 8 containing an amplifier to bring the rectified voltage to the required level. The control voltage is applied to the control stage 9, for example a magnetic amplifier, which controls the current through the filament of the projection lamp 2.

In order to avoid oscillations there are provided between the control voltage generator 8 and the control stage 9 damping means consisting of the filter condenser 11, the series resistance 12 and the RC element 13. Transistor 10 connects either the relatively high voltage applied to terminal 14 or that applied to terminal 15 to said damping means, so that the time constant of the arrangement described above is reduced.

In order that the condensers 11, 13 of this arrangement cannot be charged to said high voltage at a failure of the control signal, because otherwise the change in charge would take a considerable time, when the control signal returns, there is provided the diode 16. This diode is biased by the potential appearing at terminal 17, so that the voltage at the condensers 11, 13 is limited to a value dependent upon the value of said potential.

Thereby it is avoided that the voltage at the condensers 11, 13 is increased beyond an extreme value of the useful control range of the control circuit arrangement. In every case, even when the control signal is absent for a certain period of time, a small control time constant of the control circuit is obtained.

Figure 2:
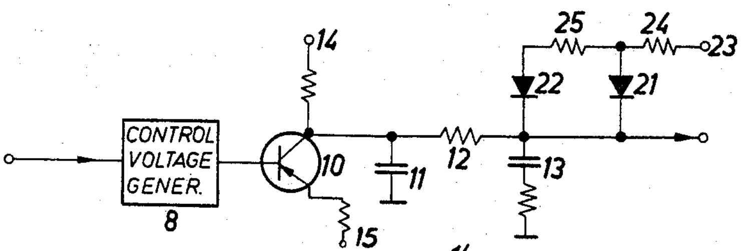
FIG. 2 is a preferred embodiment of a part of the control arrangement described in relation to FIG. 1.

FIG. 2 represents a different embodiment of the arrangement 18 described in relation to FIG. 1. In said embodiment there are provided two diodes 21, 22 for limiting the control range of the control circuit arrangement to its two extreme values. Fixed bias voltages are applied to each of said diodes by the potential appearing at terminal 23 by way of the resistances 24, 25.

Figure 3:
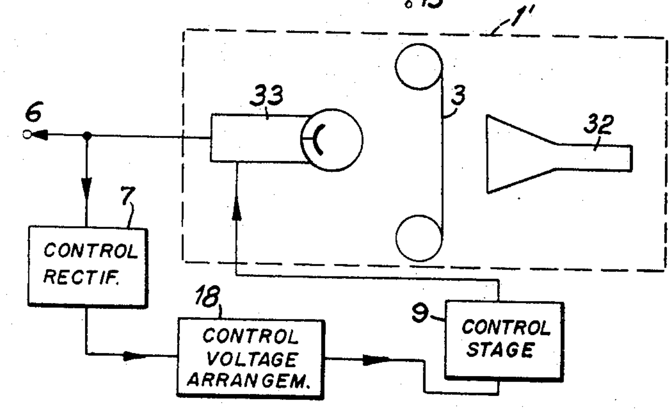
FIG. 3 is a block circuit diagram of the control arrangement of FIG. 1 in which the television camera is replaced by a flying spot scanner.

The arrangement 1 described in relation to FIG. 1 may be replaced in FIG. 3 by an arrangement 1' having a flying spot scanner 32, in which for example the gain of the photo multiplier 33 may be controlled.

What is claimed is:

1. A circuit arrangement for controlling the level of a television signal produced by a television scanning device scanning an object comprising, in combination, a control rectifier rectifying said television signal produced by said television scanning device; a control voltage generator having its input connected to the output of said control rectifier and providing control voltage; oscillation damping means connected to the output of said control voltage generator; voltage limiting means connected to said oscillation damping means for limiting said control voltage to a predetermined value; and a control stage connected to the junction of said oscillation damping means and said voltage limiting means and connected to said television scanning device, said television scanning device comprising a flying spot scanner tube producing a light spot scanning an object, and a photo multiplier producing said television signal in accordance with the characteristics of said object, said control stage controlling the gain of said photo multiplier so as to compensate said television signal for variation in contrast characteristic of different objects.

2. A circuit arrangement for controlling the level of a television signal produced by a television scanning device scanning an object comprising, in combination, a control rectifier rectifying said television signal produced by said television scanning device; a control voltage generator having its input connected to the output of said control rectifier and providing a control voltage; oscillation damping means connected to the output of said control voltage generator; voltage limiting means connected to said oscillation damping means for limiting said control voltage to a predetermined value; and a control stage connected to the junction of said oscillation damping means and said voltage limiting means and connected to said television scanning device for adjusting at least one characteristic of said television scanning device, whereby said television signals produced by said television scanning device are compensated for variations in contrast of different objects.

3. The circuit arrangement as defined in claim 2 wherein said television scanning device comprises a television camera producing said television signal by scanning said object; and a projection lamp for illuminating said object scanned by said television camera, the intensity of said projection lamp being varied by said control stage so as to compensate said television signal for variations in contrast of different objects.

4. The circuit arrangement as defined in claim 2 wherein said voltage limiting means comprises a diode network for limiting the magnitude of said control voltage within a range of two predetermined values.

5. The circuit arrangement as defined in claim 2 wherein said voltage limiting means comprises a diode connected to a fixed potential and biased thereby so that said control voltage is limited to a predetermined magnitude.

6. The circuit arrangement as defined in claim 2 wherein said voltage limiting means comprises a diode network having two diodes connected to fixed potentials and biased thereby so that said control voltage is limited within a predetermined range of values.

7. The circuit arrangement as defined in claim 2 wherein said oscillation damping means comprises a resistor-capacitor network.

8. The circuit arrangement as defined in claim 2 wherein said control stage is a magnetic amplifier.

References Cited

UNITED STATES PATENTS

| | | | |
|---|---|---|---|
| 2,804,498 | 8/1957 | Theile | 178—7.2 |
| 2,431,824 | 12/1947 | Poch | 178—7.2 |
| 2,804,550 | 8/1957 | Artzt | 178—7.2 |
| 2,890,278 | 6/1959 | Seur et al. | 178—7.2 |

ROBERT L. GRIFFIN, *Primary Examiner.*

R. L. RICHARDSON, *Assistant Examiner.*